United States Patent [19]

Björkman

[11] 4,268,306
[45] May 19, 1981

[54] PROCESS FOR REMOVING MERCURY FROM SOLID WASTE MATERIAL

[75] Inventor: Karl-Åke G. Björkman, Karlskrona, Sweden

[73] Assignee: Lumalampan AB, Karlskrona, Sweden

[21] Appl. No.: 123,971

[22] Filed: Feb. 25, 1980

Related U.S. Application Data

[60] Division of Ser. No. 58,278, Jul. 17, 1979, which is a continuation-in-part of Ser. No. 27,901, Apr. 6, 1979, abandoned.

[30] Foreign Application Priority Data

Apr. 12, 1978 [SE] Sweden ............................... 7804104

[51] Int. Cl.³ ............................................. C22B 43/00
[52] U.S. Cl. ............................................. 75/81; 75/10 V
[58] Field of Search ............................... 75/10 V, 81

[56] References Cited

U.S. PATENT DOCUMENTS 2,450,098  9/1948  Smith ................................. 202/203

FOREIGN PATENT DOCUMENTS 360683  10/1973  Sweden ................................ 75/81
460311   6/1975  U.S.S.R. ............................. 75/10 V

*Primary Examiner*—M. J. Andrews
*Attorney, Agent, or Firm*—Frishauf, Holtz, Goodman & Woodward

[57] ABSTRACT

The invention provides apparatus and a process for removing mercury from solid waste material. The solid waste material is placed in a vacuum chamber. The chamber is heated above the vaporization temperature of mercury. A vacuum condition is formed and then, while the temperature is maintained above the vaporization temperature of mercury, an inert gas is placed in the vacuum chamber. During this heating period, the pressure in the vacuum chamber is periodically varied from a maximum to a minimum. The apparatus utilized is a vacuum chamber, a vacuum pump, and a pipe that contains a mercury condenser. The pipe also functions through a side inlet as a means for introducing the inert gas into the vacuum chamber, while the vacuum pump is closed off. A control unit for controlling the alternate periods of mercury vapor withdrawal and inert gas introduction into the vacuum chamber is provided.

7 Claims, 2 Drawing Figures

PROCESS FOR REMOVING MERCURY FROM SOLID WASTE MATERIAL

This is a division of application Ser. No. 58,278 filed July 17, 1979, which, in turn, is a continuation-in-part of Ser. No. 27,901, filed Apr. 6, 1979, now abandoned.

The present invention provides a process for separating metallic mercury which occurs as a component of solid material of a waste nature, for example, burned-out electric light sources of defective electric light sources which are not marketable, and an apparatus for carrying out the process.

Mercury is a poison to all organisms. Its injurious effects on the environment are well known. As a consequence, since 1974 it has been prohibited to dispose of mercury-containing refuse in refuse dumps in Sweden. The County Government Boards are charged with the responsibility of enforcing the regulations relating to the handling and disposing of unsafe refuse in open-air environments. The accepted content of mercury permitted in refuse which may be disposed of in open-air dumps differs from county to county. The most severe regulation now in force permits only 50 ppm mercury as the maximum mercury content in the refuse.

In disregard of such regulations, people generally include in their usual refuse broken thermometers, burned-out batteries, and other mercury-containing waste material. Mercury-containing refuse is flushed from dentists' clinics into the sewage systems without treatment. On the other hand, most industrial plants working with mercury of mercury-containing materials, have to store their waste because there is no existing method which is adequate to remove the mercury to meet the presently existing rigorous standards.

A process is known for separating mercury from such solid waste material when the material can be exposed to temperatures above the boiling point of mercury. The material is placed in a vacuum distillation plant and heated while maintaining the vacuum. The mercury-containing waste material is placed into a sealed chamber in said plant and the mercury which is vaporized is removed through a pipe, which then passes through a cooling trap between the vacuum chamber and the vacuum pump. The mercury vapor condenses in the cooling trap and metallic mercury is maintained. In operation, even when this process is carried out for twenty four hours or longer, the treated refuse product still contains a mercury content which is in excess of the maximum values permitted by the government regulations, even when the distillation is carried out at a temperature considerably higher than the boiling point of mercury.

THE INVENTION

The present invention provides an improved process for removing mercury from solid material using vacuum distillation of the mercury. During the vacuum distillation period while the mercury is being heated and distilled, an inert gas, e.g., nitrogen, is placed in the vacuum chamber and the pressure in the chamber is varied, preferably periodically, during the vacuum distillation procedure. The intermittent variation of the partial pressure of the inert gas is broadly within the range of about 40 and 80 kPa, i.e., kilo Pascal, and preferably between 40 and 53 kPa. The intermittent variation of said pressure is carried out after the vacuum chamber has been heated to a temperature above the boiling point of mercury. When the portion of the process wherein the pressure of the nitrogen is varied (pressure pulsation portion of process) is completed, the pressure in the vacuum chamber is reduced below and limit of the Pirani effect and maintained until the chamber and the solid material therein have cooled down.

The apparatus of the present invention includes a vacuum chamber connected via a pipe to a vacuum pump. A cooling trap is positioned in said pipe between the chamber and the pump. The apparatus also provides means for injecting the inert gas into the vacuum chamber, preferably through an inlet in said connecting pipe between the vacuum chamber and the cooling trap. The apparatus is also provided with at least one valve in said cooling pipe and at least one valve in said inert gas injection means to control the respective flows of inert gas and mercury vapor, preferably during sequential portions of the process cycle.

DETAILED DESCRIPTION OF THE INVENTION

Figure 1:
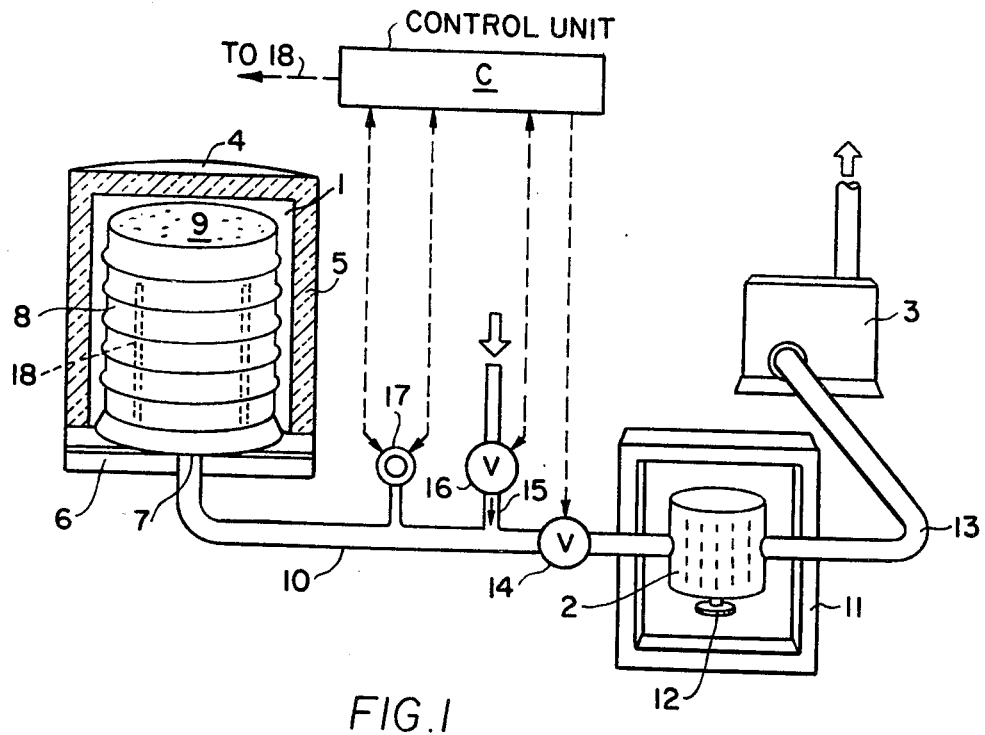
FIG. 1 is a schematic diagram of the apparatus and the connections utilized in the process.

A vacuum distillation plant contains a vacuum chamber 1, a cooling trap 2, a vacuum pump 3, and pipes connecting those units. The vacuum chamber 1 is suitably made with a bell chamber 4 consisting of thick insulated walls 5. The bell chamber 4 is sealed to a bottom 6, in the center of which there is an opening 7 for communication with the vacuum pump 3. A reaction vessel 8 containing a charge 9, e.g., burned-out fluorescent tubes, is placed in the vacuum chamber 1. From the bottom opening 7 of the vacuum chamber a pipe 10 leads to the cooling trap 2, which is located in a cooling chamber 11. From the bottom of the cooling trap 2 a connecting socket 12 projects, which may be provided with a manually controlled valve for removing condensed mercury. From the cooling trap 2 a pipe 13 leads to the vacuum pump 3. In the pipe 10 there is a main valve 14, e.g., a magnetic valve, outside the freezer 11. Between the main valve 14 and the vacuum chamber 1 there is a pipe 15 which connects into pipe 10. Through that pipe an inert gas, e.g., nitrogen, is lead into the pipe 10 and to the vacuum chamber 1. In the pipe 15 there is a tightly closing valve 16. In connection with said valve 16 there is an adjustable needle valve for control of the inflow speed of the inert gas. On the pipe 10 there is a vacuum meter 17. On its scale it has contacts at certain pressure levels, which are utilized in the process. The said contacts can be electric or pneumatic. They are used to control the vacuum pump 3, the main valve 14 and the stop valve 16 for the inert gas.

The process is illustrated as follows. The mercury-containing solid material 9 to be purified is placed in the reaction vessel 8, which is placed in the vacuum chamber 1. When the bell chamber 4 has been positioned over the reaction vessel 8 and stands on the bottom 6 of the vacuum chamber, the vacuum pump 3 is started. The pump very quickly reduces the pressure to the minimum level of its capacity, and then the leak-proofness of the vacuum chamber and the rest of the system is controlled. After the main valve 14 has been closed, the step valve 16 is opened, and the nitrogen is let into the vacuum chamber 1 at a speed controlled by the needle valve mentioned above. Then a control unit C controls the process. This unit receives impulses from the contacts on the vacuum meter 17. The nitrogen is let into the system until the pressure has reached 53 kPa. Then the valve 16 closes, the vacuum pump 3 starts, the main valve 14 opens and the pressure in the vacuum chamber 1 is reduced to 40 kPa. During this period of time, the vacuum chamber is heated, which is suitably done by means of electric resistance rods 18 located in the vacuum chamber. As vaporized mercury is ionized at a pressure lower than 40 kPa, a contact on the vacuum meter scale gives an impulse to the automatic unit to close the main valve 14 and stop the vacuum pump 3, as soon as the pressure in the system has reached that level. After that the stop valve 16 opens and the nitrogen is let into the system, till the pressure has reached 53 kPa. Then the stop valve 16 closes, the vacuum pump 3 starts, and the main valve 14 opens, after which the cycle is repeated several times per hour during, say, 4 hours.

Figure 2:
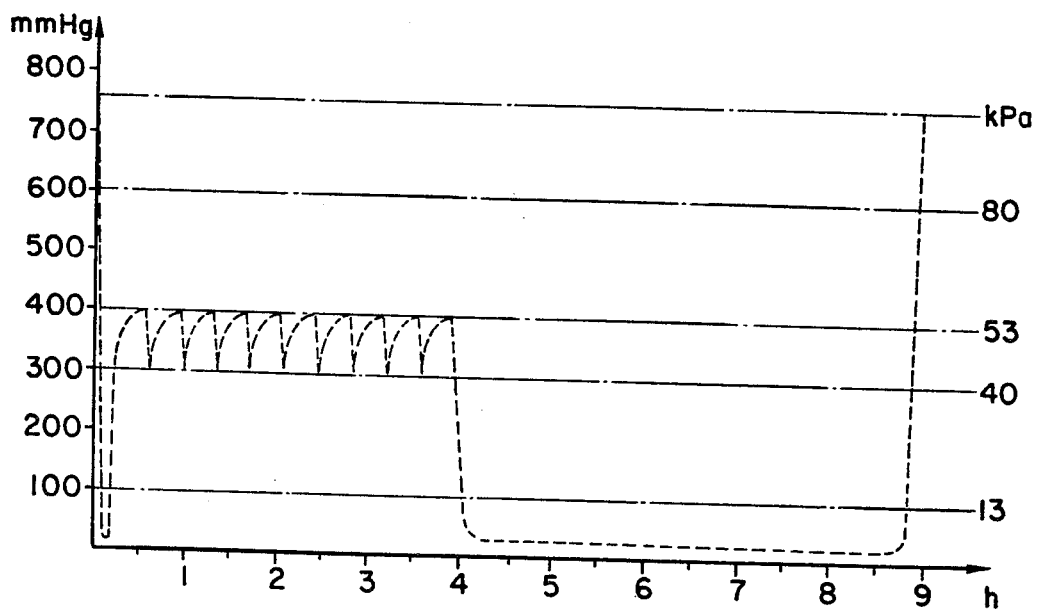
FIG. 2 illustrates a pressure-time diagram of the pressure in the vacuum chamber while the process is being carried out.

The sequencing disclosed above can readily be instrumented as follows. The control unit C is responsive to output pulses from the vacuum meter 17 and then causes timed cycling of the respective valves 14, 16. The timing function is obtained, for example, by a cam-control timer switch of the type commercially available and used with commercial home laundry equipment, suitably connected to control opening and closing of the valves 14, 16, as explained above and in connection with FIG. 2 for the time periods indicated and additionally under control of the vacuum meter 17. The vacuum meter 17 can be in the form of a standard sending unit responsive to threshhold levels of sensed vacuum and connected, for example, similar to the water level pressure switch in a washing machine. The output of commercial vacuum sensing elements can be signal-processed in various ways, for example, to provide output pulses when certain vacuum levels are sensed, by connecting the output of the element 17 to suitable threshold circuits, such as commercially available operational amplifiers.

The heat supplied for vaporization of the mercury is obtained from heating rods 18 located within a vacuum chamber 1, and preferably within the reaction vessel 8. The turn-on and turn-off of the heating units can be controlled from control unit C, as schematically shown by the connection from the control unit.

It is quite possible to allow the pressure of the inert gas to vary between the limit of ionization and a safety limit of 80 kPa. but the best separation effect has been obtained when the pressure has varied between 40 and 53 kPa. Should the stop valve 16 for the inert gas get stuck or some other trouble occur in the system causing the pressure in the vacuum chamber 1 to rise to 80 kPa, a contact on the vacuum meter 17 provides an impulse to the automatic control unit C, which switches off the heat in the vacuum chamber and starts the vacuum pump 3. In this way, vaporized mercury is prevented from leaking out into the room where the plant is located.

The heating of the vacuum chamber from room temperature to the boiling point of mercury (356.58° C.) is preferably carried out in 1-1½ hour in the illustrated apparatus. During the continued period of separation up to 4 hours after the start, the temperature of the vacuum chamber is allowed to rise slowly to nearly 400° C. During this time, the material to be treated reaches the temperature of the vacuum chamber. When using nitrogen as the inert gas, the following advantages are obtained. The mercury is prevented from oxidizing, the heating occurs rapidly, and the temperature throughout the material to be treated becomes uniform. Because of the pressure pulsation of the gas, vaporized mercury is removed from all existing cavities in the material being treated.

After a 4 hour treatment period, the stop valve 16 is closed, the vacuum pump 3 is started, and the main valve 14 is opened. The vacuum pump then reduces the pressure in the whole plant below the limit for the Pirani effect (13 kPa), which causes a thermos effect in the vacuum chamber 1. In this way, the material to be treated is cooled down as slowly as possible during about 5 hours, preferably to substantially ambient temperature. Then the vacuum pump 3 is stopped and atmospheric air can be let into the system.

The mercury separated from the material treated has condensed in the cooling trap 2, the lower part of which forms a collecting container of about 10 liters volume. If 200 burned-out fluorescent tubes a day are treated in the plant, the volume of condensed mercury is only a few liters, so the bottom container of the cooling trap 2 will have to be emptied only once a week.

A chemical analysis of the material treated after completion of the separation process has shown that the remaining content of mercury is about 0.6 ppm. This value is approximately 1% of the separation effect of earlier separation plants in industrial use.

While the vaporization of the mercury is being carried out, the sequence of pressure cycles between the high and low pressures, e.g., between 53 and 40 kPa, should be at least 2 cycles per hour, and preferably 4 cycles per hour. Best results have been obtained in the illustrated apparatus with about 3½-4 cycles per hour. Excellent results have been obtained, as disclosed hereinbefore, when utilizing a period at heat of about 4 hours with the illustrated plant. This preferable period may vary depending upon the size and other design parameters of each plant, additionally taking into account the quantity and characteristics of the solid waste material being treated and the mercury content thereof, as well as the form in which the mercury is contained therein.

Various changes and modifications may be made, and features described in connection with any one of the embodiments may be used with any of the others, within the scope of the inventive concept.

What is claimed is:

1. A process for removing mercury from mercury-containing solid waste material comprising in combination heating said mercury-containing solid waste material in a vacuum chamber to a temperature above the vaporization temperature of mercury, lowering the pressure in said vacuum chamber to about 40 kPa, and then introducing an inert gas into said vacuum chamber and raising the pressure therein to a value which is not in excess of about 80 kPa, and withdrawing mercury vapor from said chamber while at the same time decreasing the pressure therein to a value of about 40 kPa, followed by the introduction of said inert gas to raise the pressure up to a maximum of about 80 kPa, and repeating said sequence of mercury vapor withdrawal and addition of inert gas until the desired amount of mercury has been removed from said vacuum chamber.

2. The process of claim 1, wherein the pressure is lowered to about 40 kPa while mercury is being withdrawn and wherein the pressure is raised to about 53 kPa by the introduction of said inert gas, and said cycles of mercury vapor withdrawal and inert gas introduction are controlled substantially within said pressure range.

3. The process of claim 1 or claim 2, wherein after said desired amount of mercury is withdrawn, the pressure in the vacuum chamber is reduced below the limit of the Pirani effect and maintained at said pressure until the chamber and the solid material contained therein have cooled down.

4. The process of claim 3, wherein said sequence of withdrawal of vaporized mercury followed by introduction of inert gas to raise the pressure is carried out about twice per hour during the mercury vapor withdrawal portion of said process.

5. The process of claim 1 or claim 2, wherein said sequence of withdrawal of vaporized mercury followed by introduction of inert gas to raise the pressure is carried out at least twice per hour during the mercury vapor withdrawal portion of said process.

6. The process of claim 5, wherein said sequence is carried out for about 4 cycles per hour.

7. The process of claim 5, wherein said sequence is carried out for between about 3.5 and 4 cycles per hour.

* * * * *